(12) United States Patent
Honjo

(10) Patent No.: US 8,073,885 B2
(45) Date of Patent: Dec. 6, 2011

(54) RECORDING APPARATUS, FILE DESCRIPTOR GENERATION METHOD, AND PROGRAM

(75) Inventor: Ryoki Honjo, Kanagawa (JP)

(73) Assignee: Sony Corporation, Tokyo (JP)

( * ) Notice: Subject to any disclaimer, the term of this patent is extended or adjusted under 35 U.S.C. 154(b) by 297 days.

(21) Appl. No.: 12/418,680

(22) Filed: Apr. 6, 2009

(65) Prior Publication Data

US 2009/0259634 A1 Oct. 15, 2009

(30) Foreign Application Priority Data

Apr. 9, 2008 (JP) ................ P2008-101722

(51) Int. Cl.
*G06F 12/00* (2006.01)
*G06F 17/30* (2006.01)

(52) U.S. Cl. .......... 707/821; 707/822; 707/831; 714/15; 714/16; 714/17

(58) Field of Classification Search .......... 707/821, 707/822, 831; 714/15, 16, 17
See application file for complete search history.

(56) References Cited

U.S. PATENT DOCUMENTS

| 5,335,323 | A | * | 8/1994 | Kolnick | ............ | 715/765 |
| 6,961,941 | B1 | * | 11/2005 | Nelson et al. | ............ | 719/319 |
| 2002/0087916 | A1 | * | 7/2002 | Meth | ............ | 714/16 |
| 2002/0178176 | A1 | * | 11/2002 | Sekiguchi et al. | ............ | 707/200 |
| 2007/0233880 | A1 | * | 10/2007 | Nieh et al. | ............ | 709/227 |
| 2007/0294578 | A1 | * | 12/2007 | Qiao et al. | ............ | 714/17 |
| 2008/0270422 | A1 | * | 10/2008 | Craft et al. | ............ | 707/100 |
| 2008/0270829 | A1 | * | 10/2008 | Craft et al. | ............ | 714/15 |
| 2009/0037550 | A1 | * | 2/2009 | Mishra et al. | ............ | 709/208 |
| 2009/0259634 | A1 | * | 10/2009 | Honjo | ............ | 707/3 |

FOREIGN PATENT DOCUMENTS

| JP | 08-087477 | 4/1996 |
| JP | 10-320220 | 12/1998 |
| JP | 2000-020328 | 1/2000 |
| JP | 2003-519872 | 6/2003 |
| JP | 2006-127461 | 5/2006 |

OTHER PUBLICATIONS

Alf Zugenmaier—"FLASCHE—A Mechanism Providing Anonymity for Mobile Users"—SpringerLink—Privacy Enhancing Technologies—Computer Science, 2005—vol. 3424/2005, (pp. 729-730/121-141/1-21).*

(Continued)

*Primary Examiner* — Jean B Fleurantin
*Assistant Examiner* — Anh Ly
(74) *Attorney, Agent, or Firm* — Finnegan, Henderson, Farabow, Garrett & Dunner, L.L.P.

(57) ABSTRACT

A recording apparatus includes a server, a client, a virtual device, a judgment section, and a regeneration section. The server executes an access to a storage medium as a service. The client includes processes that require the service. The virtual device is used to perform communication between the server and the client using a socket. The judgment section judges, when a process of the client opens the virtual device, whether the virtual device is already opened. The regeneration section regenerates, when the virtual device is already opened, a file descriptor for the process that references the socket based on an existing kernel file table.

6 Claims, 7 Drawing Sheets

OTHER PUBLICATIONS

Soltesz et al.—"Container-based Operating System Virtualization: A Scalable, High-performance Alternative to Hypervisors"—EuroSys'07—Proceedings of the 2$^{nd}$ ACM SIGOPS/Eurosys conference on computer systems—2007 (pp. 275-287:1-13).*

Hirokazu Takahashi and Kazuto Miyoshi, "Explanation with Illustrations Design Implementation of Linux Kernel 2.4" No. 7 File system, Linux Japan, Gohashi Research Laboratory Co., Ltd. May 1, 2001, vol. 4, No. 5, pp. 139-165.

Japanese Office Action issued on Feb. 9, 2010 in corresponding Japanese Application No. 2008-10172. ( 7 pages including 3 pages of the Office Action and 4 pages of translation of the Office Action).

* cited by examiner

RECORDING APPARATUS, FILE DESCRIPTOR GENERATION METHOD, AND PROGRAM

CROSS REFERENCES TO RELATED APPLICATIONS

The present invention contains subject matter related to Japanese Patent Application JP 2008-101722 filed in the Japanese Patent Office on Apr. 9, 2008, the entire contents of which being incorporated herein by reference.

BACKGROUND OF THE INVENTION

1. Field of the Invention

The present invention relates to a recording apparatus, a file descriptor generation method, and a program.

2. Description of the Related Art

In kernels of UNIX (registered trademark), LINUX (registered trademark), and the like, file descriptors are employed as a mechanism for processes and threads to operate an object such as a file and a socket. The file descriptors are managed by a process table for each process, and their entities are mere numbers sequentially assigned by the kernel. In the process table, an index to an entry of a kernel file table is registered in association with the file descriptor. As an entry corresponding to the indices of the kernel file table, an index to a data structure of the object such as a file or a socket is registered.

Japanese Patent Application Laid-open No. 2006-127461 (paragraph [0084]) discloses communication processing between a client and a server using a file descriptor. After allocating a file descriptor to a socket created by a socket system call using a bind system call, a server-side process executes a listen system call and sets a getting-ready-for-connection status. Meanwhile, a client-side process creates a socket by the socket system call and establishes a communication path with respect to the server-side socket using a connect system call. The server-side process executes an accept system call and accepts a request from the client-side process. After completion of the connection, a write system call as write processing and a read system call as read processing with respect to a file descriptor corresponding to the socket are used to realize message transmission/reception.

SUMMARY OF THE INVENTION

When a plurality of processes or threads of the client frequently request the server of a service, there are cases where it is desirable to share, without newly creating a socket for each request, a virtual bidirectional FIFO communication path (e.g., stream-oriented socket and TCP socket). Therefore, in the related art, the file descriptor has been handed over among processes. However, for handing over the file descriptor among processes, it has been necessary to establish a socket communication path for the handover and transmit/receive the file descriptor itself by using a sendmsg system call or a recvmsg system call, the procedure of which is complicated.

Moreover, in an operation in which the plurality of processes or threads of the client request the server of a service and the server sequentially executes the service in response to the request from each of the processes, it is necessary to carry out mutual exclusion such that, when requests are issued from the plurality of processes at the same time, processing on the server side with respect to the request from one of the processes is carried out first and then the request from other processes. Therefore, it has been necessary to carry out the mutual exclusion on the server side in the related art.

In view of the circumstances above, there is a need for a recording apparatus, a file descriptor generation method, and a program with which a plurality of processes or threads of a client can communicate with a server while sharing a single socket, without having to hand over a file descriptor among processes.

According to an embodiment of the present invention, there is provided a recording apparatus including a server, a client, a virtual device, a judgment means, and a regeneration means. The server executes an access to a storage medium as a service. The client includes processes that require the service. The virtual device is used to perform communication between the server and the client using a socket. The judgment means judges, when a process of the client opens the virtual device, whether the virtual device Is already opened. The regeneration means regenerates, when the virtual device is already opened, a file descriptor for the process that references the socket based on an existing kernel file table.

In the recording apparatus according to the embodiment of the present invention, the regeneration means may search out a file descriptor assigned with an unused number from a process table of the process, and register in the process table the file descriptor and a first index to an entry in which a second index to a data structure of the socket, that is referenced by a process that has already opened the virtual device, is registered in the kernel file table, in association with each other.

The recording apparatus according to the embodiment of the present invention may further include means for setting, when the process opens the virtual device, an allowable limit for other processes to open the virtual device by operating a semaphore of a kernel.

A process that has already opened the virtual device is one of the same process as the process that is trying to open the virtual device and a different process from the process that is trying to open the virtual device.

According to another embodiment of the present invention, there is provided a file descriptor generation method including: judging, by a judgment means, when a virtual device used to perform communication between a server to execute a service and a client including processes that require the service using a socket, is to be opened by a process of the client, whether the virtual device is already opened; and regenerating, by a regeneration means, when the virtual device is already opened, a file descriptor for the process that references the socket based on an existing kernel file table.

According to another embodiment of the present invention, there is provided a program causing a computer to operate as a judgment means and a regeneration means. The judgment means judges, when a virtual device used to perform communication between a server to execute an access to a storage medium as a service and a client including processes that require the service using a socket, is to be opened by a process of the client, whether the virtual device is already opened. The regeneration means regenerates, when the virtual device is already opened, a file descriptor for the process that references the socket based on an existing kernel file table.

According to the embodiments of the present invention, a plurality of processes of a client can communicate with a server while sharing a single socket, without having to hand over a file descriptor among the processes.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, an embodiment of the present invention will be described with reference to the drawings.

Figure 1:
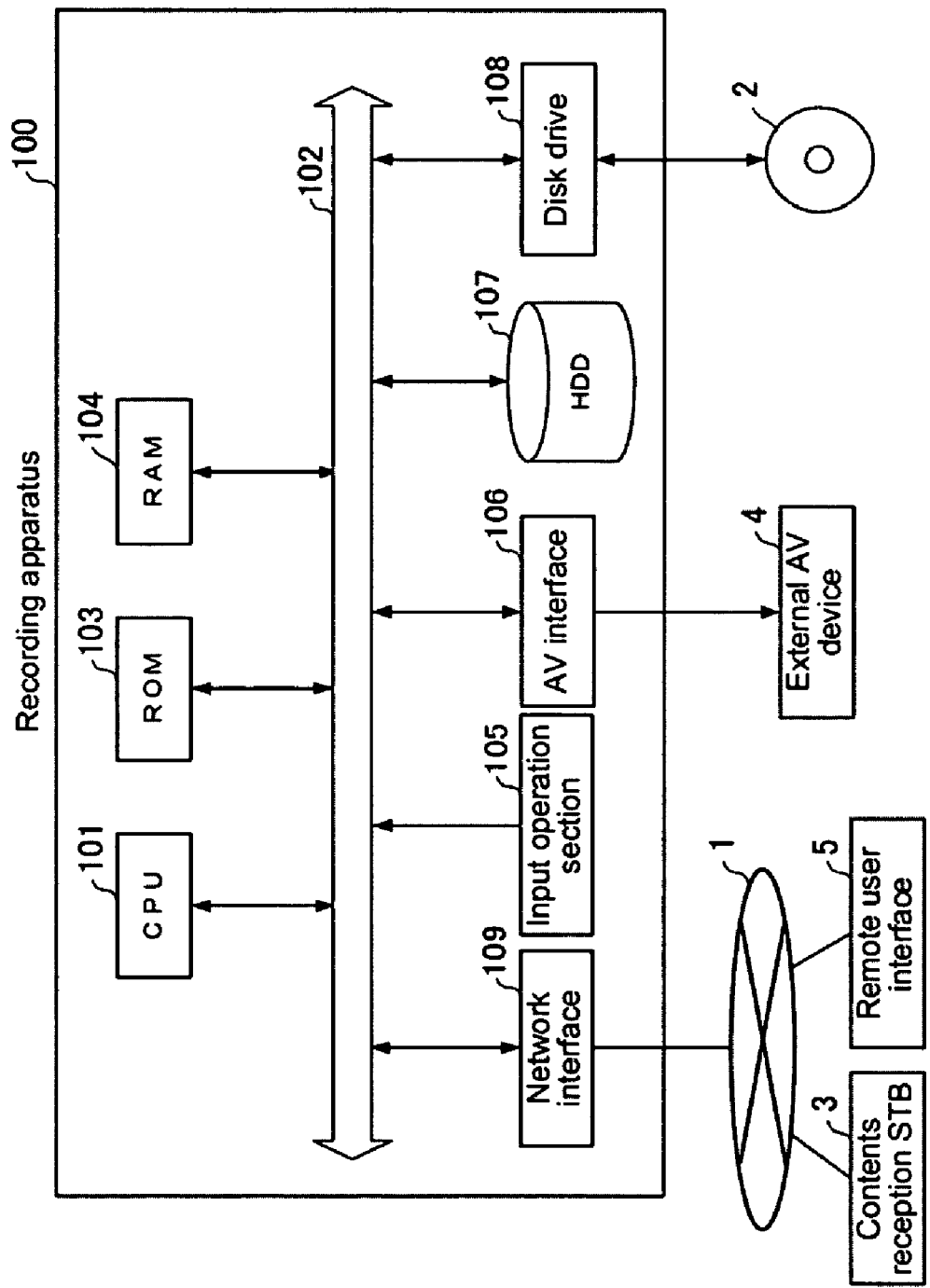
FIG. 1 is a diagram showing a hardware structure of a recording apparatus according to an embodiment of the present invention.

FIG. 1 is a diagram showing a hardware structure of a recording apparatus 100 according to the embodiment of the present invention.

As shown in the figure, a CPU (Central Processing Unit) 101 is connected with, via a system bus 102, a ROM (Read Only Memory) 103, a RAM (Random Access Memory) 104, an input operation section 105, an AV interface 106, an HDD (Hard Disk Drive) 107, a disk drive 108, and a network interface 109.

The CPU 101 executes operational processing based on software such as a program or data stored in the ROM 103. The ROM 103 stores an OS (Operating System) necessary for operating the recording apparatus 100 and software such as data and programs including applications run on the OS. The RAM 104 is used as a work area of the CPU 101, an area for retaining various types of information, and the like.

The input operation section 105 includes various keys and processes various instructional inputs from a user. Instructions input through the input operation section 105 is supplied to the CPU 101 via the system bus 102.

The AV interface 106 interfaces with an external AV device 4 such as a television.

The HDD 107 is a storage medium that stores contents, user data such as metadata of those contents, and other types of data.

Into the disk drive 108, a removable medium 2 as the storage medium, such as a Blu-ray disk and a DVD (Digital Versatile Disk) can be loaded, and thus data is written to and read from the removable medium 2.

The network interface 109 makes a connection with a network 1 such as a LAN (Local Area Network) in a residence, for example. The recording apparatus 100 can be connected with, via the network 1, external devices such as a contents reception STB (Set Top Box) 3 and a remote user interface 5.

The contents reception STB 3 is capable of receiving, for example, broadcast contents transmitted through broadcast waves of terrestrial analog television broadcast, terrestrial digital television broadcast, CS digital broadcast, BS digital broadcast, and the like, and webcast contents delivered through a network such as the Internet, and transmitting the received contents to the recording apparatus 100 via the network 1.

The remote user interface 5 is a device capable of remotely operating the recording apparatus 100 via the network 1, like a cellular phone or a PC, for example.

Figure 2:
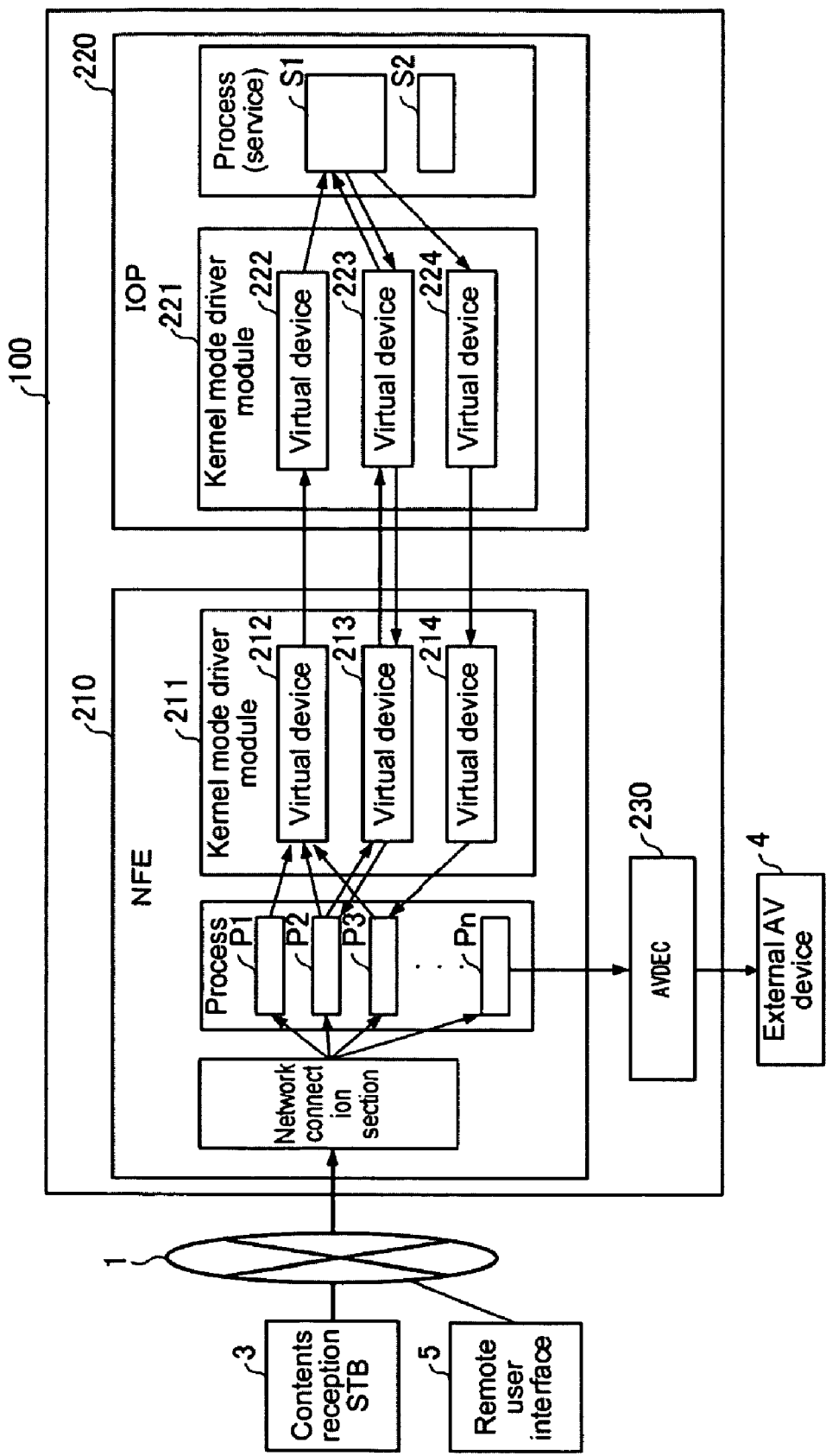
FIG. 2 is a diagram showing a software structure of the recording apparatus shown in FIG. 1.

Next, a software structure of the recording apparatus 100 will be described with reference to FIG. 2.

Software of the recording apparatus 100 is roughly divided into an NFE (Network Front End) 210, an IOP (Input Output Processor) 220, and an AVDEC (Audio Visual DECoder) 230.

The NFE 210 mainly assumes a function regarding the network. The IOP 220 carries out access of write and read with respect to the HDD 107 and the storage medium such as the removable medium 2 loaded into the disk drive 108, and manages metadata, for example. For appropriately distributing processing loads of the CPU 101, the NFE 210 and the IOP 220 are roughly connected via a high-speed link such as the Ethernet (registered trademark). The NFE 210 and the IOP 220 are respectively installed with, as loadable modules, kernel mode driver modules 211 and 221 for introducing corresponding virtual devices 212, 213, 214, 222, 223, and 224. The loadable module is a module for adding a function without changing a kernel itself as a basic component of the operating system.

The virtual devices 212, 213, 214, 222, 223, and 224 provided by the kernel mode driver modules 211 and 221 are each a device for performing communication between the NFE 210 and the IOP 220 using a socket. Here, three virtual devices are introduced in each of the kernel mode driver modules 211 and 221. Specifically, first virtual devices 212 and 222 that are used to perform communication between the NFE 210 as a client and the IOP 220 as a server, second virtual devices 213 and 223 that are used to perform parallel communication, and third virtual devices 214 and 224 that are used to perform communication between the NFE 210 as the server and the IOP 220 as the client, are respectively introduced. Hereinafter, descriptions will be given only on the first virtual devices 212 and 222 with the NFE 210 as the client and the IOP 220 as the server.

The NFE 210 (client) includes a plurality of processes (including threads) P1 to Pn that require a service provided by the IOP 220 (server), and the IOP 220 (server) includes a process Si for sequentially processing the service in response to a request from the plurality of processes (including threads) P1 to Pn of the NFE 210 (client). Therefore, the communication between the client and the server becomes N:1. It should be noted that the IOP 220 (server) may include a process S2 in addition to the process S1.

Prior to the communication using the socket, the NFE 210 (client) and the IOP 220 (server) secure a communication path by opening the virtual devices 212 and 222. An example of a timing prior to the communication is a time when the recording apparatus 100 is activated. As long as the timing is precedent to the communication, the timing can be an arbitrary timing after activation.

Next, processing of opening the virtual devices 212 and 222 of the NFE 210 (client) and the IOP 220 (server), respectively, will be described.

(Processing of Opening Virtual Device of Client)

Figure 3:
FIG. 3 is a flowchart on processing of opening a virtual device of a client.

FIG. 3 is a flowchart on processing of opening a virtual device of the client.

The NFE 210 generates and activates a process (supposedly referred to as "process P1") that requires the service of the IOP 220 (server). The process P1 requests opening of the virtual device 212 for performing communication using the socket. Upon request of opening of the virtual device 212 from the process P1, the NFE 210 calls a (down(&sem_0)) function of the kernel by a system call and carries out a down operation with respect to a semaphore to set a value of the semaphore to "0" (Step S101). Accordingly, other processes that try to open the virtual device 212 afterwards are set to a sleep status since the value of the semaphore is "0".

Subsequently, an open count correlated to the virtual device 212 is incremented (Step S102). The open count is a variable for managing an open instance count for each virtual device, an initial value of which is "0". The open count is decremented every time the virtual device 212 is released. A correspondence between the open and release is managed by the kernel.

Next, the NFE 210 executes a vmalloc( ) function by the system call and secures a memory in a virtual address space of the process P1 (Step S103).

Then, the NFE 210 judges whether a value of the open count is "1" (Step S104). The open count value is "1" when the virtual device 212 is opened for the first time. The open count value of "2" or more indicates that the virtual device 212 has already been opened by any of the processes or threads. Here, any of the processes refers to either the same process as or a different process from the process that is trying to open the virtual device 212.

Here, descriptions will first be given assuming that the virtual device 212 has been opened for the first time, and the open count value is thus "1".

The NFE 210 executes a socket( ) function by the system call to obtain a file descriptor (psockfd) as a return value thereof (Step S105). Accompanying this, the NFE 210 registers an index to a socket structure (sock) in a kernel file table. In addition, the NFE 210 registers in a process table of the process P1 the file descriptor (psockfd) and an index to an entry in which the index to the socket structure (sock) is registered in the kernel file table, in association with each other.

Subsequently, the NFE 210 executes, by the system call, a connect( ) function with the file descriptor (psockfd) as an argument, to thus establish a connection with a port of the server-s de virtual device 222 (Step S106).

Next, the NFE 210 executes, by the system call, a sockfd lookup( ) function with the file descriptor (psockfd) as the argument, to thus obtain the socket structure (sock) as a value of a variable p_socket, and stores the value in the virtual memory of the kernel (Step S107). The variable p_socket of the socket structure (sock) is used as an argument when executing a sock_remap_fd( ) function to be described later.

After that, the NFE 210 substitutes the file descriptor (psockfd) for file→private_data as a private variable for each open instance of the virtual device. Thus, the kernel can thereafter operate the socket structure using the file descriptor (psockfd) stored as file→private_data when read, write, and the like are requested by the process P1.

Finally, the NFE 210 calls an (up(&sem__0)) function by the system call and carries out an up operation with respect to the semaphore, to thus set the value of the semaphore back to "1". Accordingly, an allowable limit of the open processing by the semaphore is canceled (Step S109).

Now, a relationship among the file descriptors, the process table, the kernel file table, and the socket structure will be described.

The file descriptor is a number sequentially assigned to an object such as a socket, a device, and a file by the kernel starting from a predetermined value when the process opens the object. The process table is a table for managing the file descriptor that references the object opened for each process. In the process table, the file descriptor and the index to the entry of the kernel file table in which the index to the object that the process references is registered, are registered in association with each other. In the kernel file table, an index to the data structure for managing an entity of the opened object is registered.

Figure 7:
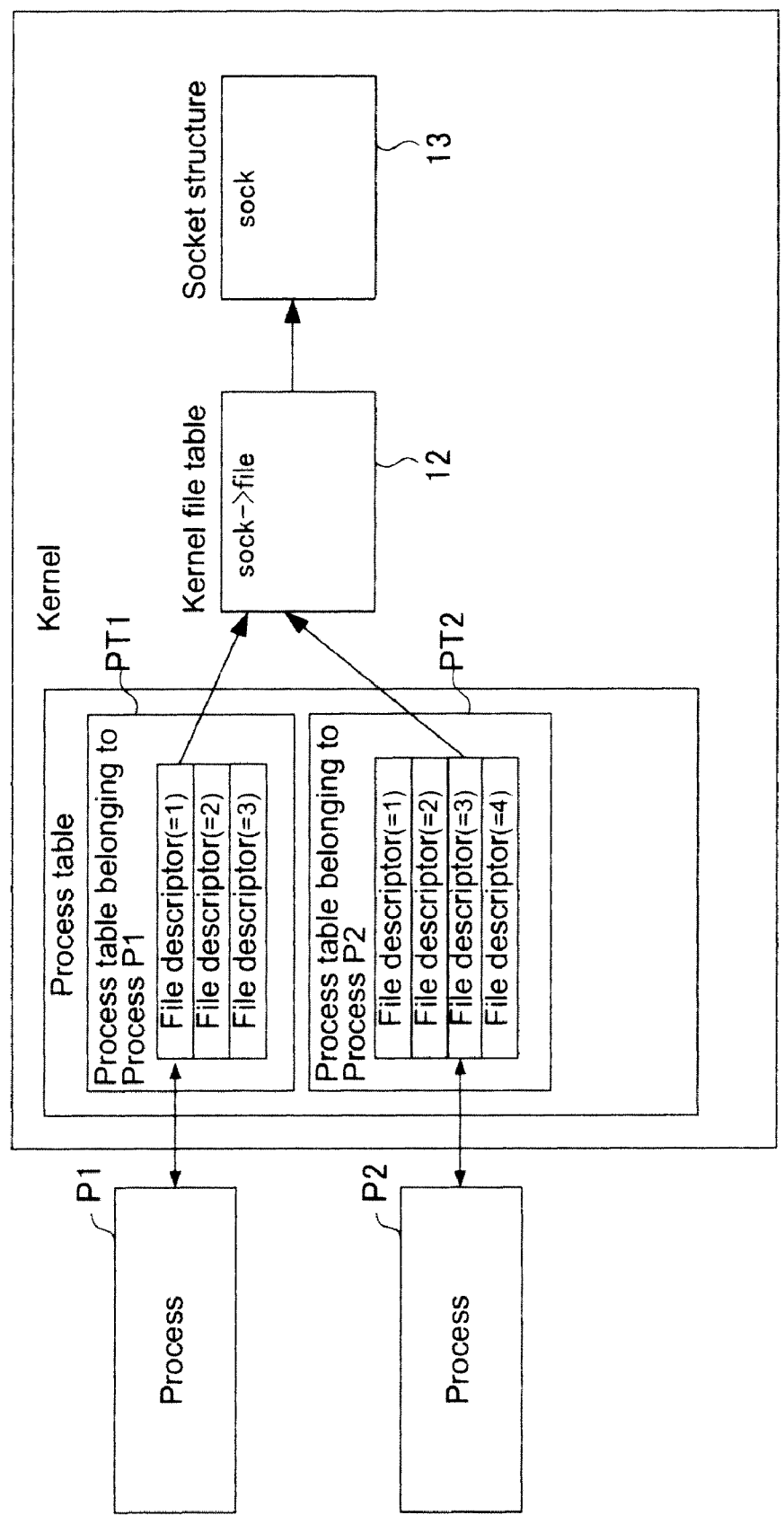
FIG. 7 is a diagram showing an example of a relationship among processes, file descriptors, a process table, a kernel file table, and a socket structure.

FIG. 7 is a diagram showing an example of the relationship among the processes, the file descriptors, the process table, the kernel file table, and the socket structure. In this example, numbers of 1 to 3 are registered as the file descriptors in a process table PT1 of the process P1. An index to the entry of the kernel file table 12 in which the index to the object such as the socket structure that is referenced by the process P1 is registered, is registered in association with each of the file descriptors. Meanwhile, numbers of 1 to 4 are stored as the file descriptors in a process table PT2 of the process P2. An index to the entry of the kernel file table 12 in which the index to the object such as the socket structure that is referenced by the process P2 is registered, is registered in association with each of the file descriptors. Here, the file descriptor (=1) of the process table PT1 of the process P1 and the file descriptor (=3) of the process table PT2 of the process P2 are associated with the same entry in the kernel file table 12, and thus the common socket structure 13 is referenced thereby.

Next, an operation carried out after it is judged in Step S104 that the open count value is other than "1", that is, "2" or more will be described. The open count value of "2" or more indicates that the virtual device 212 has already been opened by any of the processes or threads. Therefore, in the process table of that process, the file descriptor (psockfd) and the index to the entry of the kernel file table in which the index to the socket structure is registered, are already registered in association with each other.

In this case, the NFE 210 executes the sock_remap_fd( ) function for regenerating the file descriptor (psockfd) for the process P1 based on the existing kernel file table, with the value of the variable p_socket of the socket structure (sock) as the argument.

Figure 4:
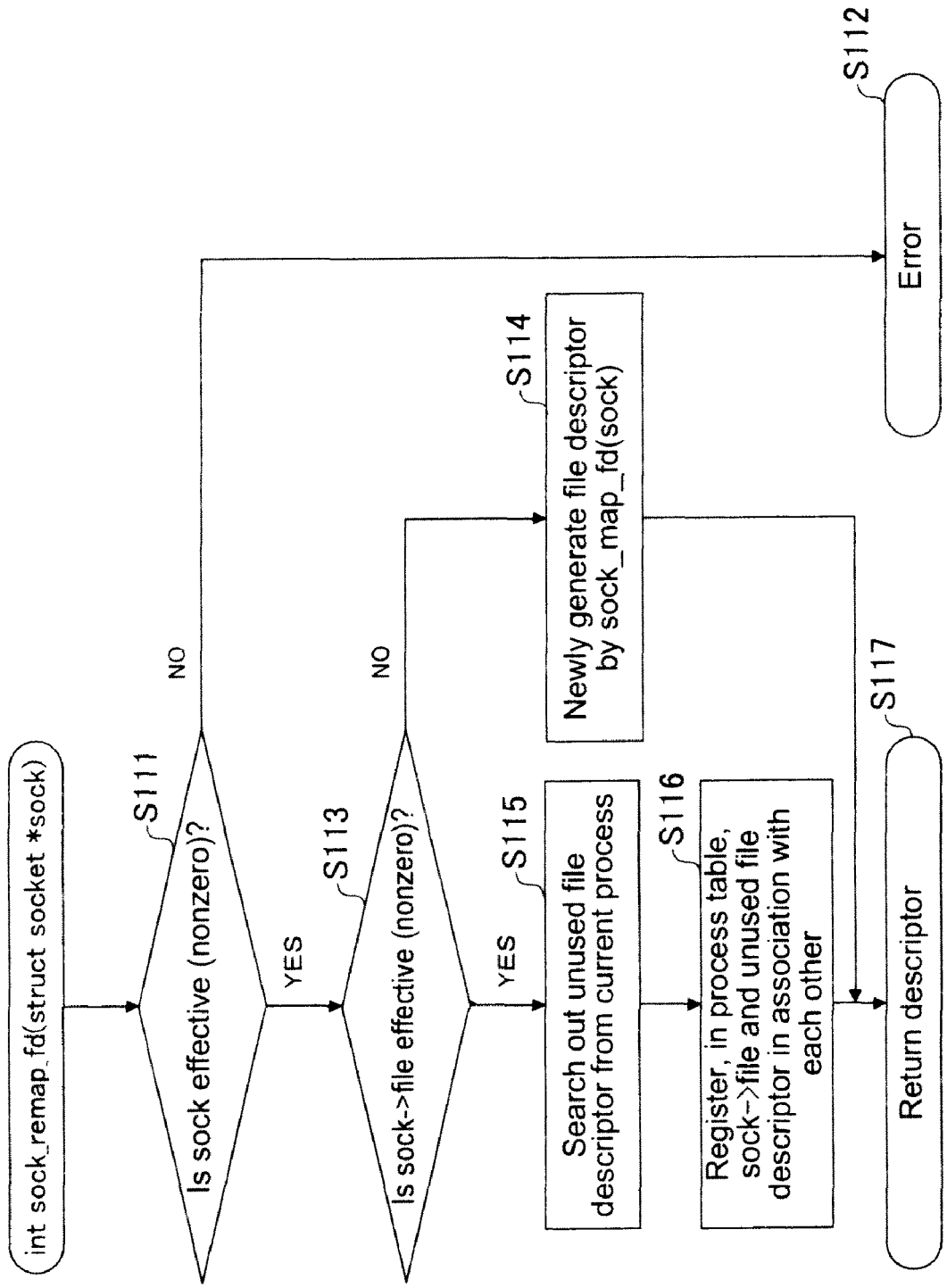
FIG. 4 is a flowchart on a sock_remap_fd( ) function.

FIG. 4 is a flowchart on the sock_remap_fd( ) function.

The NFE 210 first confirms whether the socket structure (sock) whose value is the variable p_socket exists within the kernel (Step S111). When the corresponding socket structure (sock) does not exist in the kernel due to some failure, the processing is ended as an error (Step S112).

When confirmed that the corresponding socket structure (sock) exists, the NFE 210 next confirms whether there is an entry (sock→file) in the kernel file table in which the index to the socket structure (sock) is registered (Step S113). When the corresponding entry (sock→file) does not exist in the kernel file table due to some failure, the NFE 210 executes by the system call a sock_map_fd( ) function with the value of the socket structure (sock) as the argument. Accordingly, the file descriptor (psockfd) that references the socket structure (sock) is generated (Step S114). Accompanying this, the NFE 210 registers the index to the socket structure (sock) in the kernel file table. In addition, the NFE 210 registers, in the process table of the process P1, the file descriptor (psockfd) and the index to the entry in which the index to the socket structure (sock) is registered in the kernel file table, in association with each other. After that, the file descriptor (psockfd) is output as a return value of the sock_remap_fd( ) function (Step S117).

Referring back to FIG. 3, the NFE 210 thereafter substitutes the file descriptor (psockfd) for file→private_data as the private variable for each open instance of the virtual device. Thus, the kernel can thereafter operate the socket structure using the file descriptor (psockfd) stored as file→private_data when read, write, and the like are requested by the process P1.

Finally, the NFE 210 calls the (up(&sem__0)) function by the system call and carries out the up operation with respect to the semaphore, to thus set the value of the semaphore back to "1". Accordingly, the allowable limit of the open processing by the semaphore is canceled (Step S109).

Further, when it is judged in Step S113 of FIG. 4 that the corresponding entry (sock→file) of the kernel file table exists, the NFE 210 searches out the file descriptor (psockfd) assigned with an unused number from the process table of the process P1 (Step S115). Then, the NFE 210 registers in the process table of the process P1 the file descriptor (psockfd) and the index to the entry in which the index to the socket structure (sock) is registered in the kernel file table, in association with each other (Step S116). After that, the NFE 210 outputs the file descriptor (psockfd) as a return value of the sock_remap_fd( ) function (Step S117).

Referring back to FIG. 3, the NFE 210 thereafter substitutes the file descriptor (psockfd) obtained as the return value of the sock_remap_fd( ) function for file→private_data as the private variable for each open instance of the virtual device in the same manner. Thus, the kernel can thereafter operate the socket structure using the file descriptor (psockfd) stored as file→private_data when read, write, and the like are requested by the process P1.

The sock_remap_fd( ) function above may also be employed for processing of opening a virtual device of the server.

(Processing of Opening Virtual Device of Server)

Figure 5:
FIG. 5 is a flowchart on processing of opening a virtual device of a server.

FIG. 5 is a flowchart in the case where the sock_remap_fd( ) function is employed for the processing of opening a virtual device of the server.

The IOP 220 generates and activates a process (supposedly referred to as "process S1") for processing the service. The process S1 requests opening of the virtual device 222 for performing communication using the socket. Upon request of opening of the virtual device 222 from the process S1, the IOP 220 calls a (down(&sem_0)) function of the kernel by a system call, and carries out a down operation with respect to a semaphore to set a value of the semaphore to "0" (Step S201). Accordingly, other processes that try to open the virtual device 222 afterwards are set to a sleep status since the value of the semaphore is "0".

Subsequently, the IOP 220 increments an open count correlated to the virtual device 222 (Step S202). An initial value of the open count is "0". The open count is decremented every time the virtual device 222 is released. A correspondence between the open and release is managed by the kernel.

Next, the IOP 220 executes a vmalloc( ) function by the system call and secures a memory in a virtual address space of the process S1 (Step S203).

Then, the IOP 220 judges whether a value of the open count is "1" (Step S204). The open count value is "1" when the virtual device 222 is opened for the first time. The open count value of "2" or more indicates that the virtual device 222 has already been opened by any of the processes or threads. Here, any of the processes refers to either the same process as or a different process from the process that is trying to open the virtual device 222.

Here, descriptions will first be given assuming that the virtual device 222 has been opened for the first time, and the open count value is thus "1".

The IOP 220 executes a socket( ) function by the system call to obtain a file descriptor (listenfd) as a return value thereof (Step S205).

Next, the IOP 220 executes a setsockopt( ) function by the system call and sets an option of the socket (Step S206). The socket option includes SO_REUSEADDR that specifies that the socket can be reused immediately even when a Listen port address once used on the server side is not fully opened, and SO_RCVBUF SO_SNDBUF as a buffer size setting.

Subsequently, the IOP 220 executes a bind( ) function by the system call and associates the "socket created by the socket( ) function" and the "own IP address and port number" with each other. Then, the IOP 220 executes a listen( ) function by the system call and commands the kernel to standby for connection to the socket from the client (Step S207).

Next, the IOP 220 executes an accepts function by the system call (Step S208). Accordingly, upon receiving a request for connection to the socket from the client, the IOP 220 registers a new file descriptor (psockfd) in the process table of the process S1 and registers in the process table an index to an entry in the kernel file table associated with the file descriptor (listenfd), in association with the new file descriptor (psockfd).

Then, the IOP 220 executes, by the system call, a shutdown( ) function with the file descriptor (listenfd) as an argument, to thus disable the connection between the client and the socket to which the file descriptor (listenfd) is allocated (Step S209). Accordingly, the next connection request from the virtual device 212 of the client is rejected using the file descriptor (listenfd).

Next, the IOP 220 executes, by the system call, a sockfd lookup( ) function with the file descriptor (psockfd) as the argument to thus obtain the socket structure as a value of the variable p_socket, and stores the value in the virtual memory of the kernel (Step S210).

After that, the IOP 220 substitutes the file descriptor (psockfd) for file→private_data as the private variable for each open instance of the virtual device (Step S211). Thus, the kernel can thereafter operate the socket structure using the file descriptor (psockfd) stored as file→private_data when a next request is issued from the process S1.

Finally, the IOP 220 calls an (up(&sem_0)) function by the system call and carries out an up operation with respect to the semaphore to set the value of the semaphore back to "1". Accordingly, the allowable limit of the open processing by the semaphore is canceled (Step S212).

Next, an operation carried out after it is judged in Step S204 that the open count value is other than "1", that is, "2" or more will be described. The open count value of "2" or more indicates that the virtual device 222 has already been opened by any of the processes or threads. Therefore, in the process table of the process that has already opened the virtual device, the file descriptor (psockfd) and the index to the entry of the kernel file table in which the index to the socket structure is registered, are already registered in association with each other.

In this case, the IOP 220 executes the sock_remap_fd( ) function for regenerating the file descriptor (psockfd) for the process S1 based on the existing kernel file table, with the value of the variable p_socket as the argument (Step S213). Because the flow of the sock_remap_fd( ) function is the same as that of the processing of opening a virtual device of the client described above, redundant parts in the description will be omitted.

After obtaining the file descriptor (psockfd) for the process S1 by executing the sock_remap_fd( ) function, the IOP 220 substitutes the file descriptor (psockfd) for file→private_data as the private variable for each open instance of the virtual device (Step S211). Thus, the kernel can thereafter operate the socket using the file descriptor (psockfd) stored as file→private_data when a next request is made by the process Si.

Finally, the IOP 220 calls the (up(&sem_0)) function by the system call and carries out the up operation with respect to the semaphore, to thus set the value of the semaphore back to "1". Accordingly, the allowable limit of the open processing by the semaphore is canceled (Step S212).

(Processing of Closing Virtual Device)

Next, processing of closing a virtual device of the client will be described. It should be noted, however, that the close processing is also applied when closing a virtual device of the server.

Figure 6:
FIG. 6 is a flowchart on processing of closing a virtual device.

FIG. 6 is a flowchart on the processing of closing a virtual device.

The NFE 210 calls the (down(&sem__0)) function of the kernel by the system call and carries out the down operation with respect to the semaphore, to thus set the value of the semaphore to "0" (Step S301).

Then, the NFE 210 judges whether a source of the system call is a user (Step S302). When the system call source is the user, the NFE 210 extracts the file descriptor (psockfd) stored in the virtual memory as private data of the process P1 (Step S303).

Next, the NFE 210 judges whether the open count value is "1" (Step S304). The open count value of "1" indicates that the number of processes (open instance count to be exact) that are using the socket referenced by the file descriptor (psockfd) is 1. Thus, other processes are not affected even when the communication using the socket is disabled. Therefore, in this case, the NFE 210 executes, by the system call, the shutdown( ) function with the file descriptor (psockfd) as the argument, to thus disable the communication using the socket that is referenced by the file descriptor (psockfd) (Step S305).

Subsequently, the NFE 210 executes, by the system call, a sockfd_put( ) function with the variable p_socket of the socket structure as the argument, to thus decrement a reference count of the socket structure (Step S306).

After that, the NFE 210 executes, by the system call, a close( ) function with the file descriptor (psockfd) as the argument, to thus delete an entry of the file descriptor (psockfd) from the process table of the process P1 that is using the socket referenced by the file descriptor (psockfd) (Step S307).

Meanwhile, the open count value of "2" or more indicates that the number of processes that are using the socket referenced by the file descriptor (psockfd) is 2 or more. Thus, the communication using the socket cannot be disabled. In this case, the NFE 210 skips the executions of the shutdown( ) function and the sockfd_put( ) function and executes the close( ) function by the system call (Step S307). Accordingly, the file descriptor (psockfd) stored as the entry in the process table of the process P1 is deleted with the communication using the socket referenced by the file descriptor (psockfd) enabled.

After that, the NFE 210 executes, by the system call, a vfree function with the private data for each open instance as the argument, to thus free the virtual memory space allocated for storing the private data for each open instance (Step S308). Subsequently, the NFE 210 decrements the open count value (Step S309). Finally, the NFE 210 calls the (up(&sem__0)) function by the system call and carries out the up operation with respect to the semaphore, to thus set the value of the semaphore back to "1". Accordingly, the allowable limit by the semaphore is canceled (Step S310).

Furthermore, when it is judged in Step S302 that the system call source is not the user, that is, a kernel routine such as a delay release processing routine, a signal processing routine, and an abnormal end processing routine, the NFE 210 judges whether the open count value is "1" (Step S311). When the open count value is "1", the NFE 210 executes a p_socket→ops→shutdown( ) function by the system call, to thus disable the communication that uses the socket without using the file descriptor (psockfd) of the process table of the process P1 (Step S312). After that, the NFE 210 executes the processes of Step S308 and after. When the open count value is "2" or more, the NFE 210 skips Step S312 since the communication that uses the socket cannot be disabled, and executes the processes of Step S308 and after.

As described above, in this embodiment, in a case where, with the virtual device of the client already opened by any of the processes or threads, an arbitrary process or thread opens that virtual device, the sock_remap_fd( ) function is executed and a file descriptor for that process is regenerated. Thus, it is possible for the plurality of processes of the client to communicate with the server while sharing a single virtual device and a socket used by the virtual device, without having to hand over the file descriptor among processes.

Generally, for the same object to be specified among processes via the file descriptor, the file descriptor has been handed over among processes. To this end, a descriptor of the file descriptor has been transmitted/received using a sendmsg system call, a recvmsg system call, and the like after establishment of the socket communication path for handover of the file descriptor. In contrast, according to this embodiment, because there is no need to establish the socket communication path for the handover of the file descriptor, a resource use efficiency is improved.

Further, according to this embodiment, in an operation in which the plurality of processes of the client request the server of the service and the server sequentially executes the service in response to the request from each of the processes, mutual exclusion that is carried out when requests are issued from the plurality of processes at the same time is realized by using the (down(&sem__0)) function of the kernel first used in the open processing. Therefore, the mutual exclusion can be realized on the client side without newly adding a function therefor.

Furthermore, the kernel mode driver modules 211 and 221 used in this embodiment are each a module installed as a loadable module for adding a specific function to the kernel by calling, by the system call, the functions of the kernel without changing the kernel itself, thus not violating a restriction for protecting a kernel according to GPL (GNU Public License).

The above descriptions have been given on the case where the process carries out operations with respect to the socket by specifying a file descriptor. However, it is also possible to apply the present invention to a case where the process carries out operations with respect to an object other than the socket, such as a file, by specifying a file descriptor.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus, comprising:
    a server to execute an access to a storage medium as a service;
    a client including processes that require the service;
    a virtual device used to perform communication between the server and the client using a socket;
    a judgment means for judging, when a process of the client opens the virtual device, whether the virtual device is already opened; and a regeneration means for:
- regenerating, when the virtual device is already opened, a file descriptor for the process that references the socket based on an existing kernel file table;
- searching a file descriptor assigned with an unused number from a process table of the process; and
- registering in the process table the file descriptor and a first index to an entry in which a second index to a data structure of the socket is registered, wherein the second index is referenced by a process that has already opened the virtual device and is registered in the kernel file table.

2. The recording apparatus according to claim 1, further comprising means for setting, when the process opens the virtual device, an allowable limit for other processes to open the virtual device by operating a semaphore of a kernel.

3. The recording apparatus according to claim 1, wherein a process that has already opened the virtual device is one of the same process as the process that is trying to open the virtual device and a different process from the process that is trying to open the virtual device.

4. A computer-implemented file descriptor generation method, comprising:
- judging, by a processor, when a virtual device used to perform communication between a server to execute a service and a client including processes that require the service using a socket, is to be opened by a process of the client, whether the virtual device is already opened;
- regenerating, by the processor, when the virtual device is already opened, a file descriptor for the process that references the socket based on an existing kernel file table;
- searching a file descriptor assigned with an unused number from a process table of the process; and
- registering in the process table the file descriptor and a first index to an entry in which a second index to a data structure of the socket is registered, wherein the second index is referenced by a process that has already opened the virtual device and is registered in the kernel file table.

5. The file descriptor generation method according to claim 4, wherein, when the process opens the virtual device, an allowable limit for other processes to open the virtual device is set by operating a semaphore of a kernel.

6. A non-transitory computer-readable storage medium storing a program that when executed on a processor, causes the processor to perform a file descriptor generation method, the method comprising:
- judging when a virtual device used to perform communication between (i) a server to execute a service and (ii) a client including processes that require the service using a socket, is to be opened by a process of the client, whether the virtual device is already opened;
- regenerating when the virtual device is already opened, a file descriptor for the process that references the socket based on an existing kernel file table;
- searching a file descriptor assigned with an unused number from a process table of the process; and
- registering in the process table the file descriptor and a first index to an entry in which a second index to a data structure of the socket is registered, wherein the second index is referenced by a process that has already opened the virtual device and is registered in the kernel file table.

* * * * *